United States Patent [19]

Yamada

[11] Patent Number: 4,723,833
[45] Date of Patent: Feb. 9, 1988

[54] LENS MOUNTING ASSEMBLY AND PROCESS

[75] Inventor: Noboru Yamada, Hachioji, Japan

[73] Assignee: Olympus Optical Company Limited, Tokyo, Japan

[21] Appl. No.: 758,043

[22] Filed: Jul. 23, 1985

[30] Foreign Application Priority Data

| Jul. 23, 1984 | [JP] | Japan | 59-152619 |
| Aug. 13, 1984 | [JP] | Japan | 59-168942 |
| Dec. 24, 1984 | [JP] | Japan | 59-272487 |

[51] Int. Cl.$^4$ ............................................. G02B 7/02
[52] U.S. Cl. ................................... 350/252; 350/253
[58] Field of Search ............... 350/242, 245, 248, 251, 350/252, 255, 589, 253

[56] References Cited

U.S. PATENT DOCUMENTS

| 4,055,761 | 10/1977 | Shimomura | 350/589 |
| 4,258,982 | 3/1981 | Skinner et al. | 350/252 |
| 4,302,076 | 11/1981 | Hashimoto | 350/252 |
| 4,506,951 | 3/1985 | Yamada | 350/253 |

FOREIGN PATENT DOCUMENTS

| 57-202508 | 12/1982 | Japan | 350/253 |
| 59-26706 | 2/1984 | Japan | 350/253 |
| 59-28107 | 2/1984 | Japan | 350/253 |
| 59-31913 | 2/1984 | Japan | 350/253 |

*Primary Examiner*—Bruce Y. Arnold
*Assistant Examiner*—Loha Ben
*Attorney, Agent, or Firm*—Robert E. Burns; Emmanuel J. Lobato

[57] ABSTRACT

A lens mounting assembly includes a frame to retain a lens. In the frame, an axially opened annular recess is formed. The lens has an annular axial projection which is received in the recess. Sufficient clearance is formed between the recess wall and the lens periphery to permit thermal expansion of the lens. Interfitting between the projection and the recess enables mechanically accurate radial and axial positioning between the lens and the frame. Elastic means, i.e., elastic adhesive or elastic member, retains the lens to the frame allowing thermal expansion and/or contraction of the lens relative to the frame.

23 Claims, 11 Drawing Figures

4,723,833

LENS MOUNTING ASSEMBLY AND PROCESS

BACKGROUND OF THE INVENTION

The present invention relates to a lens retaining mount to retain a lens in a frame.

One of the known lens retaining mounts is disclosed in Japanese Laid-Open Patent Application No. 138606/1982 and is shown in FIG. 9. As shown, a lens 101 is retained in a Frame 102 which forms inner stepped portion 103 to receive the lens 101. The lens 101 is retained by a retainer ring 104 through an elastic member 105 which engages with outer periphery of the lens 101 and is inserted between the lens 101 and the retainer ring 104. Radial and axial thermal expansion and contraction is accomodated by the elasticity of the elastic member.

In this case, radial expansion of the lens 101 is absorbed by plastic deformation of the elastic member 105. When the lens 101 is shallow plastic lens, the elastic member 105 must be sufficiently soft to allow strain free expansion. However, as the radial positioning of the lens 101 is determined by the thickness uniformity of the elastic member, the elastic member should not be very soft.

Thus, elasticity of the elastic member 105 must be determined in narrow range. Even in such case accuracy of radial positioning of the lens 101 to the frame 102 can not be sufficiently high.

Some conventional lenses are retained in the frame by adhesive material. One of the prior art is disclosed in Japanese Laid Open Patent Application No. 1958111/1983 and is shown in FIG. 11. As shown, a lens 101 is accomodated in a lens receiving space 106 of a frame 102 and is stopped by a stepped portion 103 formed in the frame 102 to determine axial positioning of the lens 101. Between the outer periphery of the lens 101 and the inner periphery of the space 106, adhesive layer 107 is formed to retain the lens 101 in the frame 102.

To form the adhesive layer 107, at first the lens 101 is placed in the receiving space 106 and an injection needle or the like is used to fill clearance between the lens 101 and inner wall of the space 106 with suitable adhesive 107. Other method is that the adhesive is uniformly applied to the periphery of rotating lens 101 and the lens 101 is inserted in the frame to contact with the stepped portion 103.

However, some problems are caused by such prior art.

(1) As the lens 101 is pulled radially when the adhesive 107 is cured and contracted, so that interval strain is produced in the lens and decrease lens characteristics.

(2) As the radial positioning of the lens 101 relative to the frame 102 must be performed before the curing of the adhesive material, non-uniform applications of adhesive or non-uniform clearance between the lens periphery and the inner wall of the frame 102, results in non-uniform thickness of the adhesive material so that when the adhesive is cured the lens apt to displace the lens position towards one radial direction. That means, radial positioning of the lens is not accurate.

(3) As the adhesive layer 107 between the lens periphery and the inner wall of the frame 102 is relatively thin and relatively hard, radial thermal expansion between the lens 101 and the frame 102 can not be sufficiently absorbed by the adhesive layer 107, so that internal strains of the lens 101 causes disadvantageous effect to the lens.

SUMMARY OF THE INVENTION

Accordingly, the primary object of the present inventions is to provide a lens mounting assembly which retains a lens with mechanically accurate radial and axial positionings and also allows free thermal dimensional change of the lens.

Another object of the present invention is to provide a lens retaining assembly which retains a lens accurately with very simple assembly process.

According to the present invention, a lens retaining assembly including a frame to retain a lens, comprises an axially opened recess in the frame, an axial peripheral projection of the lens to be received in the recess with sufficient radial clearance, and an elastically retaining means to retain the lens in the frame.

The lens may be a plastic lens.

By forming recess and projection interfitting, radial and axial positionings of the lens relative to the frame can be very accurately and easily performed. Further the lens periphery is sufficiently far from the inner wall of the recess, so that the lens can be freely expanded by temperature change.

To allow free thermal expansion or contraction of the lens, the lens is retained by elastically retaining means which may be elastic adhesive layer, or may be a removable elastic member which urges the lens.

DESCRIPTION OF PREFERRED EMBODIMENTS

Figure 1:
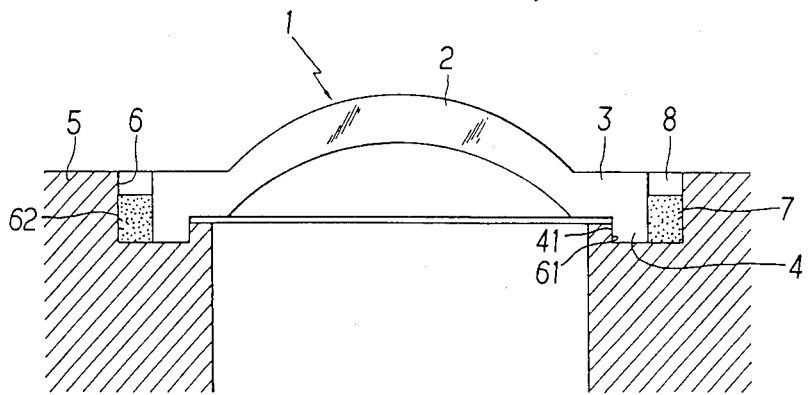
FIG. 1 is a longitudinal sectional view of a portion of the lens retaining assembly according to the first embodiment of the present invention, FIG. 2 and FIG. 3 respectively are partial sectional views of the second and third embodiments of the present invention.

Referring now to FIG. 1 which shows a first embodiment of the lens retaining assembly according to the present invention, the lens retaining assembly includes a plastic lens 1 having a lens body 2 and a flange portion 3 which extends radially outwardly from the lens body 2. According to the present invention the flange portion 3 of the lens 1 integrally forms a fitting projection 4 which extends axially from the outer end of the flange portion 3. In the embodiment shown, the projection 4 extends from the concave side of the lens 1. However, the direction of the projection can be formed to any side of the lens as desired.

The lens 1 is mounted in a cylindrical frame 5, which is made of metal having less thermal heat expansion coefficient than that of the plastic lens 1, by means of the fitting projection 4.

According to the present invention, an annular groove-like receiving recess 6 is formed on one end of the frame 5. The recess 6 is concentric with the axis of the frame 5. The recess 6 receives the fitting projection 4 of the lens 1, and the small diameter peripheral wall 61 of the recess 6 has essentially same diameter as the inner diameter of the projection 4. The large diameter peripheral wall 62 of the recess 6 has substantially larger diameter than that of the outer diameter of the lens 1. In the embodiment shown, axial length of the inner wall 61 of the recess 6 is shorter than the axial length of the inner peripheral wall 41 of the projection 4 of the lens 1.

Thus, the fitting projection 4 of the lens 1 is received in the receiving recess 6 of the frame 5 such that inner peripheral wall 41 of the projection 4 fits on the small diameter peripheral wall 61 of the recess 6, and the end surface of the projection 4 contacts with the bottom surface of the recess 6 so that accurate positioning of the lens 1 in the frame 5 can be performed easily. To retain the positioning, an elastic adhesive layer 7 of generally rectangular sectional form is formed between the outer periphery of the lens 1 and large diameter periphery 62 of the recess 6. On the adhesive layer 7, between the recess 6 and the lens 1, a lens deformation absorbing space 8 is formed.

As shown, fitting between the small diameter peripheral wall 61 of the recess and the inner peripheral wall 41 of the projection, and the contact between the end surface of the projection and the bottom surface of the recess, define radial and axial positioning between the lens 1 and the frame 5 accurately and easily without any auxiliary means e.g. jig.

Further, the elastic adhesive layer 7 is inserted between the outer periphery of the lens 1 and the large diameter periphery of the recess 6 and defines the lens deformation absorbing space 8, so that the lens 1 is retained in position while absorbing radial expansison and contraction of the lens by temperature change.

Figure 2:
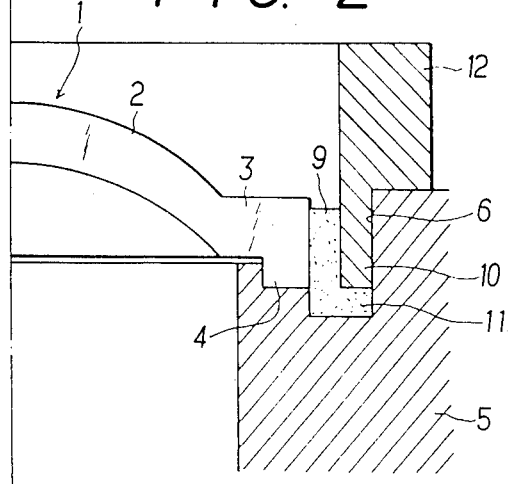

FIG. 2 shows a second embodiment of the present invention. In all the drawings, same reference numeral shows similar part or portion shown in FIG. 1 and will not be described in detail.

In the embodiment shown in FIG. 1, adhesive layer 7 defines the lens deformation absorbing space 8 which is axially outward from the adhesive layer 7. In FIG. 2, adhesive layer 9 is generally L-shaped section and defines a lens deformation absorbing space 10 between the large diameter periphery of the recess 6 and the outer peripheral surface of a portion of the adhesive layer 9. The bottom surace of the L-shaped adhesive layer 9 is on the bottom surface of the recess 6.

To form the space 10, an annular forming jig 12 is inserted in the frame 5, and is removed after the adhesive layer 9 is set.

Also as the first embodiment, in the second embodiment, radial and axial positioning between the lens 1 and the frame 5 during the assembling process, can be performed easily and accurately. As the adhesive layer 9 can be elastically displaced easily, radial expansion and contraction of the lens 1 due to temperature change can be very easily absorbed.

In the embodiment shown in FIG. 2, the bottom surface of the space 10, i.e., top surface of radially extended portion of the adhesive layer 9 is coincident with the bottom surface of the projection 4. However, the stepped depth of the recess 11 can be deeper than that shown in FIG. 2, and the radially extended portion of the adhesive layer can be deeper than that shown in FIG. 2. Thus radial deformation of the lens 1 can be more easily absorbed.

Figure 3:
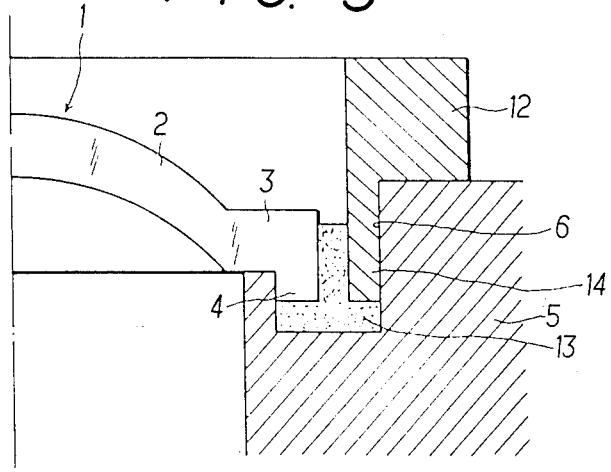

FIG. 3 shows a third embodiment of the present inventions. In the first and second embodiments, the end surface of the projection 4 contacts with the bottom surface of the recess 6 and the adhesive layer 7 or 9 forms rectangular or L-shaped section to form the deformation absorbing space 8 or 10. In the third embodiment, the axial end surface of the flange portion 3 of the lens 1 contacts with the end surface of the inner peripheral wall of the recess 6. Further, an inverted-T-shaped adhesive layer 13 is formed on the bottom surface of the recess 6 and the outer periphery of the lens 1 to form lens deformation absorbing space 14 by means of the removable space-forming jig 12 described in FIG. 2.

The feature of the third embodiment is similar with that of the second embodiment.

In the embodiments shown in FIGS. 1-3, axial height of the small diameter peripheral wall of the recess 6 is lower than that of the large diameter peripheral wall of the recess 6 of the frame 5. The heights of the wall portions may be same or may be contrary.

In the embodiments shown, the frame 5 is a simple cylindrically formed integral part. However the frame may be assembled of two or more parts and/or the recess 6 may be formed by a radially inner projected portion from the frame body.

As shown, radial and axial positioning between the lens and the frame in the assembly process can be performed easily and accurately. Further deformation of the lens due to temperature change can be absorbed by elastic adhesive layer.

Figure 4:
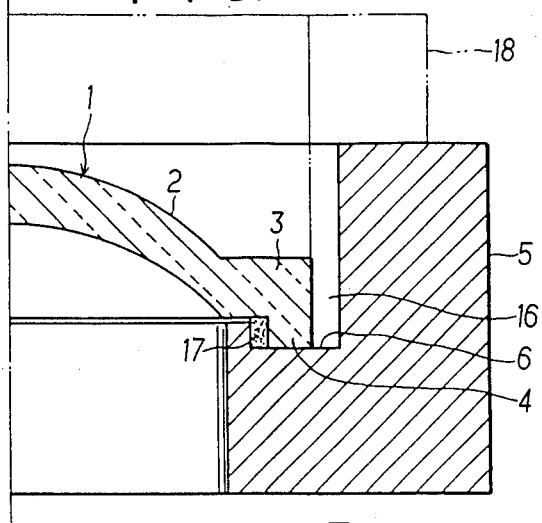
FIG. 4, FIG. 5 and FIG. 6 respectively are partial sectional views of the fourth, fifth and sixth embodiments.

FIG. 4 shows a fourth embodiment of the present invention. The receiving recess 6 which receives the fitting projection 4 of the lens 1, has smaller outer peripheral wall than the inner peripheral wall of the projections 4, and the diameter of the large diameter peripheral wall of the recess 6 is substantially larger than the outside diameter of the projection 4 of the lens 1. The axial length or depth of the small diameter peripheral wall of the recess 6 is smaller than the axial height of the inner peripheral wall of the projection 4.

The projection 4 of the lens 1 is received in the recess 6 of the frame 5 such that the end surface of the projection 4 contacts with the bottom surface of the recess 6, and constant space 16 is formed between the outer periphery of the projection 4 and the large diameter periphery of the recess 6 concentrically. To retain the lens 1 to the frame 5, an elastic adhesive layer 17 of rectangular section is inserted between the small diameter peripheral wall of the recess 6 and the inner peripheral wall of the projection 4.

To accurately concentrically place the projection 4 in the recess 6 to form constant width space 16, a cylindrical positioning jig 18 shown in phantom line in FIG. 4 is inserted until the adhesive layer 17 is set, and is removed afterwards.

In the embodiment shown in FIG. 4, radial and axial positioning between the lens 1 and the frame 5 in the assembling process can be performed easily and accurately. Relative deformation between the lens 1 and the frame 5 due to temperature change after assembly, is absorbed by elastic deformation of the adhesive layer 17 and also by the space 16. Thus, no defective strain is produced to the lens 1.

Figure 5:
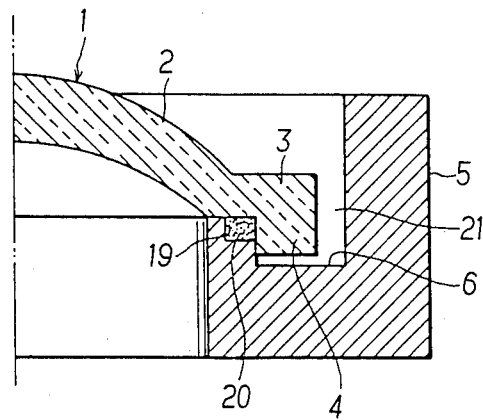

FIG. 5 shows a fifth embodiment of the present invention. In this embodiment, the small diameter peripheral wall of the recess 6 of the frame 5 has substantially the same diameter as that of the inner peripheral wall of the projection 4 of the lens 1, and the diameter of the large diameter peripheral wall of the recess 6 is substantially larger than that of the outer periphery of the projection 4. The small diameter peripheral wall of the recess 6 forms a rectangular stepped portion 19 facing the recess 6 to receive an elastic adhesive layer 20 of rectangular section.

Thus, the small diameter peripheral wall of the recess 6 of the frame 5 contacts with the inner peripheral wall of the projection 4 of the lens 1; a lens deformation absorbing space 21 is formed between the outer periphery of the recess 6 and the outer periphery of the lens 1. The end surface of the small diameter wall of the recess 6 contacts with the axial end surface of the flange portion 3 of the lens 1. The lens 1 is retained in the frame 5 by the elastic adhesive layer 20 received in the stepped portion 19 of the recess 6 and the projection 4 of the lens 1.

As described, axial and radial positioning between the lens 1 and the frame 5 is easily and accurately performed in the assembling process without utilizing any positioning jig. When the lens 1 deforms radially outwardly relative to the frame 5 due to temperature change, the adhesive layer 20 elastically deforms and the deformation absorbing space 21 allows the lens deformation, so that undesirable strain is not produced.

Figure 6:
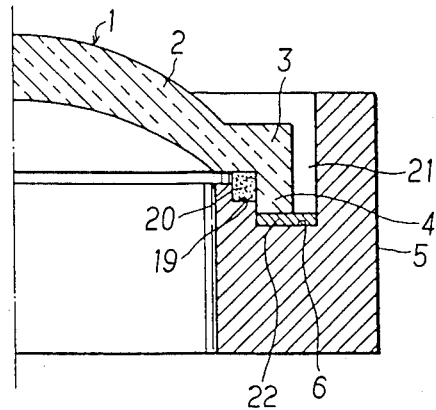

FIG. 6 shows a sixth embodiment of the present invention. In this embodiment, an annular plate 22 of predetermined thickness is placed on the bottom surface of the recess 6 and the end surface of the projection 4 contacts with the plate 22. Thus, accurate axial positioning of the lens 1 to the frame 5 can be maintained. As the plate 22, suitable low friction plastics material, e.g. tetrafluorothylene (trade name Teflon, nylon, or high density polyethylene sheet is preferable. The embodiment shown in FIG. 6 differs from the second embodiment shown in FIG. 2 as to the axial positioning of the lens 1.

In place of the low friction plastics sheet 22, low friction material e.g. tetrafluoroethylene or molybdenum disulfide may be directly coated on one of the end surfaces of the projection 4 and the bottom surface of the recess 6.

Thus, the sixth embodiment shown in FIG. 6 attains the feature as described in the fifth embodiment and also another feature that radially outward displacement of the lens 1 relative to the frame 5 is smooth.

In the embodiments shown in FIGS. 4-6, the axial length of the small diameter peripheral wall of the recess 6 is smaller than that of the large diameter peripheral wall of the recess 6. However the axial lengths may be same, or may be reverse. Also, in the embodiments, the frame 5 is an integral simple cylindrical part. However, the recess 6 may be formed on an inwardly projected annular projection from cylindrical frame 5.

It will be appreciated that in the embodiments shown in FIGS. 1-6, mechanical axial and radial positioning between the lens 1 and the frame 5 can be easily and accurately performed in the assembly process, and the lens 1 is retained in the assembled position without any additional parts, e.g. retaining ring. Further, radial outward displacement of the lens 1 relative to the frame 5 due to temperature change is absorbed by the elastic adhesive layer and also by the radial space.

Figure 7:
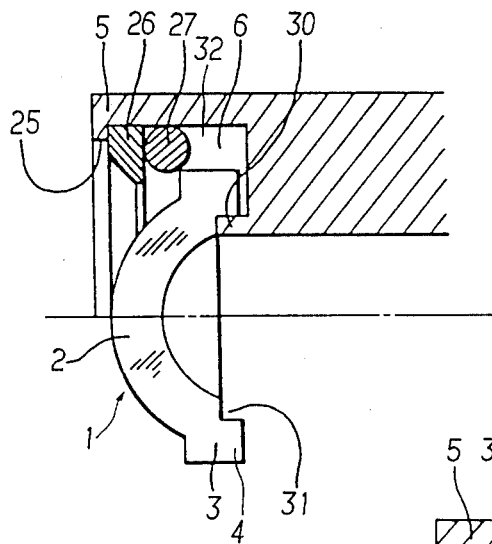
FIG. 7, FIG. 8 and FIG. 9 respectively are partial sectional views of the seventh, eighth and ninth embodiments.
Figure 8:
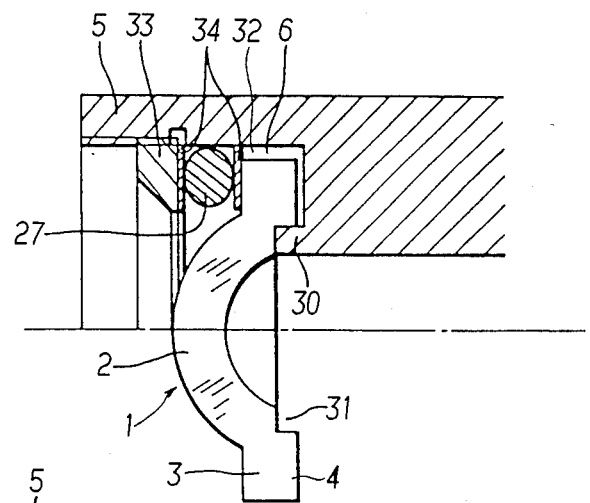
Figure 9:
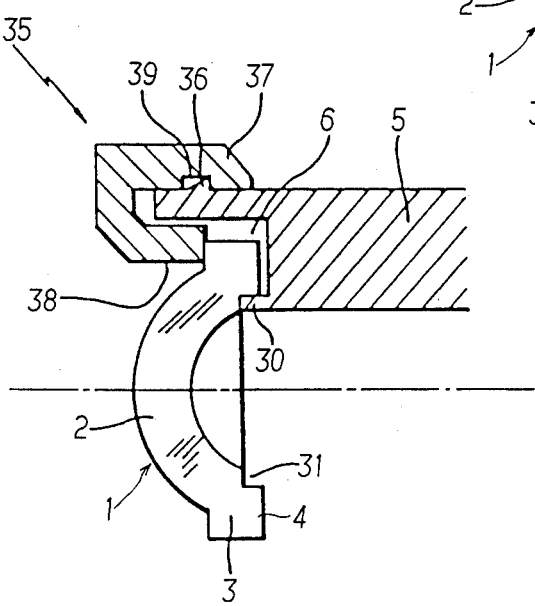
Figure 10:
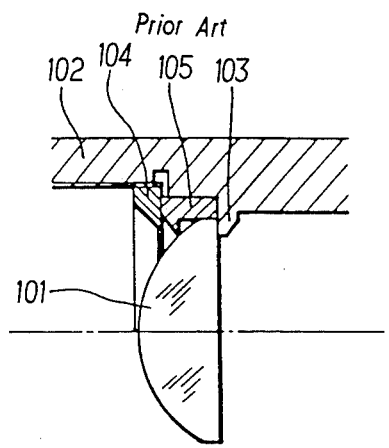
FIG. 10 and FIG. 11 are partial sectional views of prior art.
Figure 11:
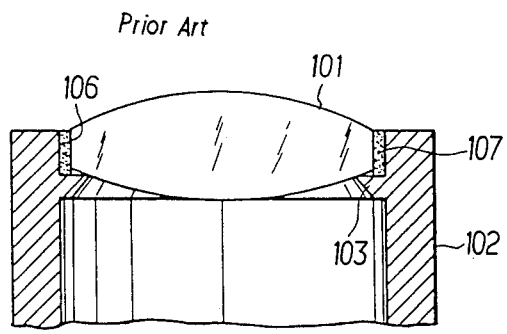

FIGS. 7-9 shows other embodiments of the present invention. Also in these embodiments, the axial projection 4 of the lens 1 is received in the recess 6 of the frame 5. As in the embodiments shown in FIGS. 3 and 5, radial positioning between the lens 1 and the frame 5 is performed by the small diameter peripheral wall of the recess 6 and the inner periphery of the projection 4 which contact each other, and axial positioning is determined by contacting the end surface of the small diameter peripheral wall of the recess 6 with the end surface of the flange portion 3 of the lens 1. As before, the diameter of the large diameter peripheral surface of the recess 6 is substantially larger than the diameter of the lens 1.

In the embodiments shown in FIGS. 1-6 the lens 1 is elastically retained to the frame 5 by the elastic adhesive layer to retain the lens permanently. In the embodiment shown in FIGS. 7-9, the lens 1 is elastically and removably retained in the frame 5, to retain the above mentioned axial and radial positioning.

More particularly, in the seventh embodiment shown in FIG. 7, a bayonet mount 25 is formed on the end portion of the large diameter peripheral wall of the recess 6 of the frame 5. A retaining ring 26 which engages with the bayonet mount 25 retains the lens 1 through an elastic O-ring 27. The O-ring 27 is elastic material e.g. silicone rubber, plastics elastomer, natural or synthetic rubber or foamed plastics.

As the retaining ring 26 engages with the bayonet mount 25, the axial position of the ring 26 is determined so that urging force to the elastic O-ring 27 is also constant.

As described, the axial and radial positionings between the lens 1 and the frame 5 is determined by the engagement between the small diameter peripheral wall 30 and the internal stepped portion 31 of the lens 1 formed by the flange portion 3 and the projection 4 of the lens 1. Radial deformation of the lens 1 due to temperature change is allowed by the elastic O-ring 27. The lens 1 does not contact with the large diameter peripheral wall of the recess 6 by reason of the rather wide deformation absorbing space 32 formed between the frame 5 and the lens 1.

FIG. 8 shows an eighth embodiment of the present invention. In this embodiment, retainer ring 33 is adjustably screwed in the frame 5. Further, a friction reducing sheet 34 is inserted between the O-ring 27 and the lens peripheral portion 3 and between the O-ring 27 and the retainer ring 33.

The friction reducing sheet 34 may be selected from tetrafluroethylene (trade name Teflon) sheet, high density polyethylene sheet, or a rather hard sheet coated or adhered with such sheet. Thus deformation of the O-ring 27 while tightening the retainer ring 33 is not produced, so that no strain is produced in the lens 1 during the assembling process.

As the friction reducing sheet 34 is inserted between the lens peripheral portion 3 and the O-ring 27, the lens 1 can be freely expanded radially by temperature increase so that no problem of thermal strain occurs.

Two friction reducing sheets 34 are shown, however, one of the sheets may be eliminated.

The functional advantage of the embodiment shown in FIG. 8 is similar with that of shown in FIG. 7.

FIG. 9 shows a ninth embodiment of the present invention. In this embodiment, the lens 1 is retained by an elastic retainer ring 35. As before, the frame 5 forms the lens receiving recess 6 which forms the small diameter peripheral wall 30, and the lens 1 forms the axial projection 4 which forms the internal stepped portion 31. By engagement between the peripheral wall 30 of the recess 6 and the internal stepped portion 31 of the lens 1, axial and radial positionings of the lens 1 relative to the frame 5 are easily and accurately performed.

The frame 5 forms an annular projection 36, on the outside peripheral surface. The projection 36 may be discontinuous projections about the outside wall of the frame 5.

The elastic retainer ring 35 is a molded plastic body which is formed of suitable elastic material e.g. silicone rubber, plastic elastomer or formed body of rubber or plastics. The ring 35 forms outer and inner rings 37 and 38. The outer ring 37 forms an inner peripheral recess 39 which engages with the outer projection 36 of the frame 5. The inner end of the inner ring 38 engages with the peripheral portion of the lens 1, and removably retains the lens 1.

At first, the lens 1 is radially and axially positioned relative to the frame 5 by engagement of the inner stepped portion 31 of the projection 4 of the lens 1 with the small diameter peripheral wall 30 of the recess 6 of the frame 5. Then the elastic retainer ring 35 is pushed axially from the outer end of the frame 5. The outer end of the outer ring 37 of the elastic retainer 35 passes beyond the tapered projections 36 of the frame 5 and the annular recess 39 of the ring 35 engages with the projection 36 of the frame 5. Thus the retainer ring 35 is retained by the frame 5. In this position, the end of the inner ring 38 of the retainer ring 35 elastically urges the peripheral portion 3 of the lens 1. Thus, the lens 1 is elastically retained by the retainer ring 35. The urging force of the retainer ring 35 does not disturb the free thermal expansion of the lens 1 relative to the frame 5.

In the embodiments shown in FIGS. 7 and 9, lens contact portion of the O-ring 27 or the inner ring 38 of the retainer ring 35 may be coated with low friction material, e.g. Teflon (trade name), so that thermal expansion of the lens 1 relative to the frame 5 is easier as in the embodiment shown in FIG. 8.

It will be appreciated that, by forming the axial lens receiving recess 6 in the frame 5 and by forming the lens axial projection 4 which has smaller radial dimension than the recess 6, axial and radial positioning between the lens 1 and the frame 5 is very easily and mechanically accurately performed. That is, the axial positioning is performed by contacting one of the axial surface of the recess 6, i.e. the bottom surface or the end surface of the small diameter peripheral wall of the recess 6, with one of the axial surface of the lens 1, i.e. end surface of the projection 4 or end surface between the projection 4 and the flange portion 3 of the lens 1. Radial positioning is performed normally by the small diameter peripheral wall of the recess 6 and the inner peripheral wall of the projection 4. To allow radially inner contraction of the lens 1 relative to the frame 5 in cold weather, an adhesive layer 17 6 is utilized as shown in FIG. 4. Of course the positioning jig must be removed to allow radial expansion of the lens 1.

Also, according to the invention, the frame 5 and the lens 1 is retained through elastic material which allow radial expansion or contraction of the lens 1 relative to the frame 5. Thus, problem of thermal strain is not produced.

What is claimed is:

1. A lens mounting assembly comprising a frame having in an end surface an axially opening annular recess having a small diameter peripheral wall, a large diameter peripheral wall and a bottom, a lens having a radially extending peripheral flange and an axially extending annular projection on said flange, said projection having an inner peripheral surface and an outer peripheral surface, and being received in said recess of said frame, said inner peripheral surface of said projection cooperating with said small diameter peripheral wall of said recess to position said lens radially with respect to said frame, the outer peripheral surface of said projection being spaced from said large diameter peripheral wall of said recess to permit thermal expansion of said lens, said lens and said frame having cooperating surfaces for positioning said lens axially with respect to said frame, and elastic retainer means for retaining said lens in said frame.

2. A lens mounting assembly according to claim 1, in which said inner peripheral surface of said projection engages said small diameter peripheral wall of said recess to position said lens radially with respect to said frame.

3. A lens mounting assembly according to claim 2, in which said small diameter peripheral wall of said recess is stepped to form an annular groove and in which said retainer means comprises adhesive elastic material in said groove.

4. A lens mounting assembly according to claim 1, in which an elastic ring between the inner peripheral surface of said projection and the small diameter peripheral wall of said recess positions said lens radially with respect to said frame.

5. A lens mounting assembly according to claim 1, in which an end surface of said projection engages the bottom of said recess to position said lens axially relative to said frame.

6. A lens mounting assembly according to claim 1, in which an end surface of said small diameter peripheral wall of said recess engages said flange of said lens to position said lens axially with respect to said frame.

7. A lens mounting assembly according to claim 1 in which said means for retaining said lens in said frame comprises elastic material in said recess between said outer peripheral surface of said projection and said large diameter peripheral wall of said recess.

8. A lens mounting assembly according to claim 7, in which said elastic material is adhesive 9. A lens mounting assembly according to claim 8, in which said adhesive elastic material is recessed to provide a lens expansion absorbing space between said adhesive elastic material and the large diameter peripheral wall of said recess.

10. A lens mounting assembly according to claim 7, in which said elastic material comprises a removable member pressed axially between said outer peripheral surface of said projection and said large diameter wall of said recess.

11. A lens mounting assembly according to claim 1, in which said means for retaining said lens in said frame comprises a plastic retainer member axially urging said flange portion of the lens to said frame.

12. A lens mounting assembly according to claim 1, in which low friction material is interposed between said projection and the bottom of said recess.

13. A lens mounting assembly according to claim 1, in which said lens is of plastic material.

14. A process of assembling a lens on a frame comprising the steps of:
   providing a frame having in an end surface an axially opening annular recess having a small diameter peripheral wall, a large diameter peripheral wall and a bottom, providing a lens having a radially extending peripheral flange and an axially extending annular projection on said flange, said projection having an inner peripheral surface and an outer peripheral surface and being insertable into said recess, assembling said lens with said frame by inserting said projection into said recess and positioning said lens radially with respect to said frame by coaction of said inner peripheral surface of said projection and said small diameter peripheral wall of said recess, with a lens expansion space between the outer peripheral surface of said projection and said large diameter peripheral wall of said recess, and positioning said lens axially with respect to said frame by interengagement of a surface of said lens with a surface of said frame, and applying retainer means to retain said lens assembled with said frame.

15. A process according to claim 14, in which said lens is positioned radially with respect to said frame by a jig with adhesive material between said inner peripheral surface of said projection and said small diameter peripheral wall of said recess, and said jig is removed afer said adhesive material has hardened.

16. A process according to claim 14 in which said retainer means comprises elastic adhesive material introduced between the outer peripheral surface of said projection and the large diameter peripheral wall of said recess.

17. A process according to claim 16 in which, prior to introduction of said elastic adhesive material, a jig is inserted between the outer peripheral surface of said projection and the large diameter wall of said recess, said jig partially occupying the space between the outer peripheral wall of said projection and the large diameter wall of said recess, said elastic adhesive material is introduced into remaining space between the outer peripheral surface of said projection and the large diameter wall of said recess and said jig is thereafter removed.

18. A process according to claim 14 in which said inner peripheral surface of said projection engages said small diameter wall of said recess to position said lens radially with respect to said frame.

19. A lens retaining means comprising,
a frame having an axially opened recess on an end surface having a large diameter peripheral wall and a small diameter peripheral wall,
a lens having a radially extending peripheral flange which has an axially extending projection which is cooperable with said recess and having outer and inner peripheral surfaces,
said small diameter peripheral wall of the recess of the frame being adapted to fit with the inner peripheral surface of the projection, and
said large diameter peripheral wall being radially spaced from the outer peripheral surface of said projection, and
retaining means comprising means axially urging said flange portion of the lens to said frame through an elastic member.

20. A lens retaining means comprising,
a frame having an axially opened recess on an end surface having a large diameter peripheral wall and a small diameter peripheral wall,
a lens having a radially extending peripheral flange which has an axially extending projection which is cooperable with said recess and having outer and inner peripheral surfaces,
said small diameter peripheral wall of the recess of the frame being adapted to fit with the inner peripheral surface of the projection, said large diameter peripheral wall of the recess being radially spaced from the outer peripheral surface of the projection, and
retaining means comprising a plastic retainer ring axially urging said flange portion of the lens to said frame.

21. A lens retaining means comprising,
a frame having an axially opened recess on an end surface having a large diameter peripheral wall and a small diameter peripheral wall,
a lens having a radially extending peripheral flange which has an axially extending profection which is cooperable with said recess and having outer and inner peripheral surfaces,
said small diameter.peripheral wall of the recess of the frame being adapted to fit with the inner peripheral surface of the projection, and retaining means comprising an elastic adhesive layer applied between the outer peripheral surface of the projection of the lens and the large diameter peripheral wall of the recess leaving a lens deformation absorbing space.

22. A lens retaining means comprising,
a frame having an axially opened recess on an end surface having a large diameter peripheral wall and a small diameter peripheral wall,
a lens having a radially extending peripheral flange which has an axially extending projection which is cooperable with said recess and having outer and inner peripheral surfaces,
said small diameter peripheral wall of the recess of the frame being adapted to fit with the inner peripheral surface of the projection,
said large diameter peripheral wall of the recess being radially spaced from the outer peripheral surface of the projection, and retaining means comprising an elastic adhesive layer applied between the small diameter peripheral wall of the recess and the inner peripheral surface of the projection.

23. A lens retaining means comprising,
a frame having an axially opened recess on an end surface having a large diameter peripheral wall and a small diameter peripheral wall, and having a stepped portion formed on an outer end portion of the small diameter peripheral wall of the recess,
a lens having a radially extending peripheral flange which has an axially extending projection which is cooperable with said recess and having outer and inner peripheral surfaces,
said small diameter peripheral wall of the recess of the frame being adapted to fit with the inner peripheral surface of the projection,
said large diameter peripheral wall of the recess being radially spaced from the outer peripheral surface of the profection, and retaining means comprising elastic adhesive means applied in said stepped portion.

* * * * *